(12) United States Patent
Esswein et al.

(10) Patent No.: US 10,374,248 B2
(45) Date of Patent: Aug. 6, 2019

(54) HIGH SOLUBILITY IRON HEXACYANIDES

(71) Applicant: LOCKHEED MARTIN ADVANCED ENERGY STORAGE, LLC, Bethesda, MD (US)

(72) Inventors: Arthur J. Esswein, San Francisco, CA (US); John Goeltz, Carmel, CA (US); Desiree Amadeo, Lunenburg, MA (US)

(73) Assignee: Lockheed Martin Energy, LLC, Bethesda, MD (US)

( * ) Notice: Subject to any disclaimer, the term of this patent is extended or adjusted under 35 U.S.C. 154(b) by 78 days.

(21) Appl. No.: 15/647,190

(22) Filed: Jul. 11, 2017

(65) Prior Publication Data

US 2017/0309944 A1    Oct. 26, 2017

Related U.S. Application Data

(62) Division of application No. 15/166,174, filed on May 26, 2016, now Pat. No. 9,742,021, which is a division of application No. 13/887,461, filed on May 6, 2013, now Pat. No. 9,929,425.

(51) Int. Cl.
| | | |
|---|---|---|
| *H01M 8/18* | (2006.01) | |
| *H01M 8/20* | (2006.01) | |
| *H01M 8/22* | (2006.01) | |
| *H01M 8/08* | (2016.01) | |

(52) U.S. Cl.
CPC ............. *H01M 8/222* (2013.01); *H01M 8/08* (2013.01); *H01M 8/188* (2013.01); *H01M 8/20* (2013.01); *H01M 2300/0002* (2013.01); *Y02E 60/366* (2013.01); *Y02E 60/528* (2013.01)

(58) Field of Classification Search
None
See application file for complete search history.

(56) References Cited

U.S. PATENT DOCUMENTS

| | | |
|---|---|---|
| 2,293,030 A | 8/1942 | Foster |
| 2,353,782 A | 7/1944 | Neumark |
| 2,415,792 A | 2/1947 | Gravell |
| 3,573,984 A | 4/1971 | Shah |
| 3,707,449 A | 12/1972 | Reinhardt |
| 3,876,435 A | 4/1975 | Dollman |
| 3,919,000 A | 11/1975 | Yarrington |
| 3,985,571 A | 10/1976 | Reinhardt et al. |
| 3,985,585 A | 10/1976 | Tuttle et al. |
| 4,046,861 A | 9/1977 | Reinhardt et al. |
| 4,180,623 A | 12/1979 | Adams |
| 4,378,995 A | 4/1983 | Gratzfeld et al. |
| 4,563,403 A | 1/1986 | Julian |
| 5,196,109 A | 3/1993 | Scott |
| 5,472,807 A | 12/1995 | Licht et al. |
| 5,643,670 A | 7/1997 | Chung |
| 5,876,581 A | 3/1999 | Itaya et al. |
| 6,475,661 B1 | 11/2002 | Pellegri et al. |
| 7,935,366 B2 | 5/2011 | Pahuja et al. |
| 8,187,441 B2 | 5/2012 | Evans et al. |
| 2002/0159222 A1 | 10/2002 | Nomoto et al. |
| 2007/0105022 A1 | 5/2007 | Xiao et al. |
| 2008/0145723 A1 | 6/2008 | Wang et al. |
| 2008/0274385 A1 | 11/2008 | Creeth |
| 2010/0084600 A1 | 4/2010 | Ahmad et al. |
| 2010/0086823 A1 | 4/2010 | Koshino et al. |
| 2011/0244277 A1 | 10/2011 | Gordon, II et al. |
| 2012/0052347 A1 | 3/2012 | Wilson et al. |
| 2012/0171541 A1 | 7/2012 | Park et al. |
| 2012/0244406 A1 | 9/2012 | Xia et al. |
| 2013/0252062 A1 | 9/2013 | Wilkins et al. |
| 2013/0260021 A1 | 10/2013 | Lu et al. |
| 2014/0028260 A1 | 1/2014 | Goeltz et al. |
| 2014/0051003 A1 | 2/2014 | Esswein et al. |
| 2014/0295311 A1 | 10/2014 | Lipka et al. |
| 2016/0211539 A1 | 7/2016 | Goeltz |
| 2016/0276692 A1 | 9/2016 | Esswein et al. |
| 2016/0276696 A1 | 9/2016 | Esswein et al. |
| 2016/0276697 A1 | 9/2016 | Esswein et al. |

FOREIGN PATENT DOCUMENTS

| | | |
|---|---|---|
| FR | 1533662 A | 7/1968 |
| JP | 2008-096415 | 4/2008 |
| WO | WO 95/03543 | 2/1995 |
| WO | WO 2006/101239 | 9/2006 |
| WO | WO 2006/110504 | 10/2006 |
| WO | WO-2007/101284 A1 | 9/2007 |
| WO | WO-2012/162383 A1 | 11/2012 |
| WO | WO 2014/028050 | 2/2014 |

OTHER PUBLICATIONS

Cohen et al., "The Association of Ferrocyanide Ions With Various Cations," J Phys Chem, Aug. 1957, pp. 1096-1100, vol. 61, No. 8.
Gail et al., "Cyano Compounds, Inorganic," in Ullman's Encyclopedia of Industrial Chemistry, 2012, pp. 674-710, vol. 10.
Hollandsworth et al., "Zinc/Ferrocyanide Battery Development Phase IV," Lockheed Missiles and Space Company, Inc. Contractor Report, Sandia Contract DE-AC04-76DP00789, May 1985, 278 pages.
Kulesza et al., "Electrochemical preparation and characterization of hybrid films composed of Prussian blue type metal hexacyanoferrate and conducting polymer," Electrochimica Acta, Aug. 2001, pp. 4065-4073, vol. 46, No. 26-27.
Pharr et al., "Infrared Spectroelectrochemical Analysis of Adsorbed Hexacyanoferrate Species Formed during Potential Cycling in the Ferrocyanide/Ferricyanide Redox Couple," Anal Chem, Nov. 1997, pp. 4673-4679, vol. 69, No. 22.
Soloveichik, "Flow Batteries: Current Status and Trends," 2015, Chem. Rev., 115 (20), pp. 11533-11558.

(Continued)

*Primary Examiner* — Yoshitoshi Takeuchi
(74) *Attorney, Agent, or Firm* — BakerHostetler

(57) ABSTRACT

Stable solutions comprising high concentrations of charged coordination complexes, including iron hexacyanides are described, as are methods of preparing and using same in chemical energy storage systems, including flow battery systems. The use of these compositions allows energy storage densities at levels unavailable by other iron hexacyanide systems.

7 Claims, 3 Drawing Sheets

(56) References Cited

OTHER PUBLICATIONS

Torres-Gomez et al., "Energy Storage in Hybrid Organic-Inorganic Materials Hexacyanoferrate-Doped Polypyrrole as Cathode in Reversible Lithium Cells," J of the Electrochemical Society, 2000, pp. 2513-2516, vol. 147, No. 7.
Trant, et al., "Solubility of Sodium Ferrocyanide and Potassium Ferrocyanide in Solutions of NaOH and KOH Mixtures at 25° C.," University of Rochester, The David T. Kearns Center, Xerox Undergraduate Research Fellows Program, Jul. 28, 2011, 1 page.
Vercillo, et al., "Solubility of Sodium Ferrocyanide in Sodium Hydroxide and Potassium Ferrocyanide in Potassium Hydroxide," University of Rochester, The David T. Kearns Center, Xerox Undergraduate Research Fellows Program, Jul. 28, 2011, 1 page.

HIGH SOLUBILITY IRON HEXACYANIDES

CROSS REFERENCE TO RELATED APPLICATIONS

This application is a divisional of U.S. patent application Ser. No. 15/166,174, filed on May 26, 2016, which is a divisional of U.S. patent application Ser. No. 13/887,461, filed on May 6, 2013, which is a continuation-in-part of International Patent Application PCT/US2013/030430, filed on Mar. 13, 2013, which claims priority to U.S. Provisional Patent Application 61/683,260, filed on Aug. 15, 2012, each of which is incorporated by reference in its entirety.

TECHNICAL FIELD

This disclosure is in the field of energy storage systems, including electrochemical cells and flow battery systems, and methods of operating the same. In particular, the invention relates to solutions having ferrocyanide/ferricyanide concentrations higher than previously observed or employed, and the use thereof in energy storage systems.

BACKGROUND

The ferrocyanide/ferricyanide redox couple, $Fe(CN)_6^{3-/4-}$, is well understood and is frequently used in energy storage applications, but the low solubilities of available salts has limited its use, owing to the low associated energy densities. For example, the solubilities of $Na_4Fe(CN)_6 \cdot 10H_2O$, $K_4Fe(CN)_6 \cdot 3H_2O$, and $Ca_2Fe(CN)_6 \cdot 11H_2O$ in water at ambient temperatures are listed in Ullmann's Encyclopedia of Industrial Chemistry as 33.7 g, 33.7 g, and 148.4 g in 100 g of water, respectively (other sources list similar or lower values for these solubilities). These correspond to concentrations of about 0.7 M, 0.8 M, and 3 M, respectively. Given these limits, energy storage systems use the $Fe(CN)_6^{3-/4-}$ couple at concentrations lower than these at ambient temperature at all pH ranges (and are typically not greater than 0.52 M). While the use of alkaline earth metal salts may provide higher concentrations at neutral pH, their use in alkaline systems is disfavored by the precipitation of metal hydroxides—e.g., $Ca(OH)_2$.

Prior efforts to use this ferrocyanide couple in energy storage systems generally seek to overcome the inherent solubility limits of $Na_4Fe(CN)_6$ or $K_4Fe(CN)_6$ systems by engineering means and/or by operating systems at elevated temperatures. For example, one group explored the use of elaborate flow-through crystallizers in the electrolyte stream to increase the energy density of the solution from the 0.5-0.6 M [$Fe(CN)_6$] dissolved in the liquid phase by separating out insoluble crystallites. See Hollandsworth, R. P., et al., "Zinc/Ferrocyanide Battery Development Phase IV" Lockheed Missiles and Space Company, Inc., contractor report, Sandia Contract DE-AC04-76DP00789, 1985.

SUMMARY

The present inventions are directed to solutions of iron hexacyanides and their use, for example, in chemical energy storage systems, including flow battery systems. These solutions allow for energy storage densities at levels unavailable by other systems.

Various embodiments of the present invention provide solutions, preferably stable solutions, each of which comprises: (a) a charged metal-ligand coordination complex; and (b) at least two different counterions; the concentration of said coordination complex, at a given temperature, being higher than can be obtained when said coordination complex is in the presence of any single one of the at least two different counterions. In certain embodiments, the (stable) aqueous solution comprises iron(II) hexacyanide, [$Fe(CN)_6^{4-}$], in the presence of sodium and potassium ions, whereby the concentration of $Fe(CN)_6^{4-}$ in said solution, at a given temperature, exceeds the concentration of $Fe(CN)_6^{4-}$ in either a saturated solution of $Na_4[Fe(CN)_6]$ or a saturated solution of $K_4[Fe(CN)_6]$, at the same temperature. In other embodiments, the (stable) aqueous solution comprises iron(III) hexacyanide, [$Fe(CN)_6^{3-}$], in the presence of sodium and potassium ions, whereby the concentration of $Fe(CN)_6^{3-}$ in said solution, at a given temperature, exceeds the concentration of $Fe(CN)_6^{3-}$ in either a saturated solution of $Na_3[Fe(CN)_6]$ or a saturated solution of $K_3[Fe(CN)_6]$, at the same temperature.

Other embodiments provide methods of preparing an aqueous solution, preferably a stable aqueous solution of iron(II) hexacyanide, [$Fe(CN)_6^{4-}$], each method comprising dissolving sufficient amounts of $Na_4[Fe(CN)_6]$ and $K_4[Fe(CN)_6]$ in an amount of aqueous solvent (preferably water substantially free of co-solvents), so as to provide a concentration of $Fe(CN)_6^{4-}$ in said solution, at a given temperature, that exceeds the concentration of $Fe(CN)_6^{4-}$ in either a saturated solution of $Na_4[Fe(CN)_6]$ or a saturated solution of $K_4[Fe(CN)_6]$, at the same temperature.

Still further embodiments provide methods of preparing, and the resulting aqueous solutions, preferably stable aqueous solutions of iron(II) hexacyanide, [$Fe(CN)_6^{4-}$], each method comprising mixing sufficient amounts of $H_4[Fe(CN)_6]$, NaOH, and KOH in sufficient water, so as to provide a concentration of $Fe(CN)_6^{4-}$ in said solution, at a given temperature, that exceeds the concentration of $Fe(CN)_6^{4-}$ in either a saturated solution of $Na_4[Fe(CN)_6]$ or a saturated solution of $K_4[Fe(CN)_6]$, at the same temperature.

Additional embodiments provide methods of preparing, and the resulting aqueous solutions, preferably stable aqueous solutions of iron(II) hexacyanide, [$Fe(CN)_6^{4-}$], each method comprising: (a) mixing sufficient amounts of $Ca_2[Fe(CN)_6]$, NaOH, and KOH in an amount of water, so as to provide a concentration of $Fe(CN)_6^{4-}$ in said solution, at a given temperature, that exceeds the concentration of $Fe(CN)_6^{4-}$ in either a saturated solution of $Na_4[Fe(CN)_6]$ or a saturated solution of $K_4[Fe(CN)_6]$, at the same temperature; and (b) removing precipitated $Ca(OH)_2$.

The solutions resulting from any of these methods of preparing are also provided as independent embodiments.

Similarly, analogous preparations and aqueous solutions, preferably stable aqueous solutions of iron(III) hexacyanide, [$Fe(CN)_6^{3-}$] are also provided, as are solutions obtainable by the interconvertability of $Fe(CN)_6^{4-}$ and $Fe(CN)_6^{3-}$ by either chemical and/or electrochemical methods.

In various embodiments, the invention provides electrolytes comprising any of the solutions described herein, together with a supporting electrolyte and/or at least one additional redox active material. Specific embodiments provide electrolytes, each electrolyte comprising iron(II) hexacyanide, iron(III) hexacyanide, or a mixture of iron(II) hexacyanide and iron(III) hexacyanide capable of exhibiting a theoretical charge/discharge density of at least about 20 A-h/L.

In still further embodiments, the invention provides electrochemical cells, including flow battery cells, each cell having at least one half-cell comprising a solution described herein, as well as energy storage systems comprising a series array of at least one such electrochemical cell.

Also provided are methods of operating such cells or systems, each method comprising passing a current through said solution so as to effect a change in the oxidation state of the metal-ligand coordination complex and/or the iron hexacyanide complex.

The principles described herein, as well as the compositions or solutions derived from these principles and comprising a charged metal-ligand coordination complex, generally, and iron hexacyanides, specifically, may be used in a wide variety of applications, including but not limited to energy storage; energy conversion; metal extraction from ores or other matrices; electro- and electroless plating; providing soluble sources of cyanide or nitric oxide; electrochemical sensor technology; device calibration by electrochemical, spectroscopic, or magnetic means; the production of safety paper and other inks, dyestuffs, or dye formulations; animal feed supplements; electrochromics; and anti-caking agents.

BRIEF DESCRIPTION OF THE DRAWINGS

The present application is further understood when read in conjunction with the appended drawings. For the purpose of illustrating the subject matter, there are shown in the drawings exemplary embodiments of the subject matter; however, the presently disclosed subject matter is not limited to the specific methods, devices, and systems disclosed. In addition, the drawings are not necessarily drawn to scale. In the drawings.

DETAILED DESCRIPTION OF ILLUSTRATIVE EMBODIMENTS

Figure 1:
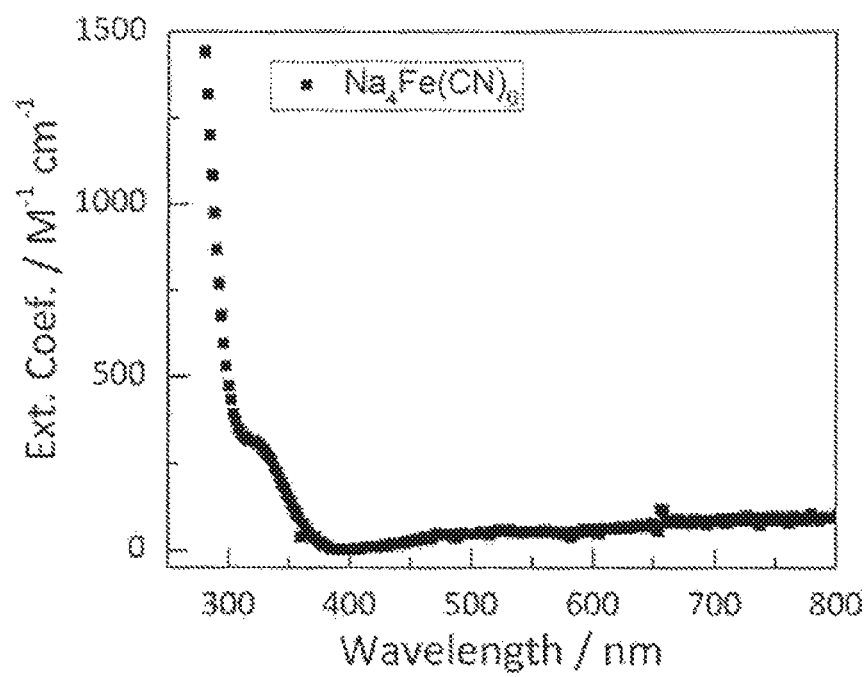
FIG. 1 illustrates a reference UV/visible spectrum of $[Fe(CN)_6]^{4-}$, plotted a the molar extinction coefficient.

The present invention may be understood more readily by reference to the following description taken in connection with the accompanying Figures and Examples, all of which form a part of this disclosure. It is to be understood that this invention is not limited to the specific products, methods, conditions or parameters described and/or shown herein, and that the terminology used herein is for the purpose of describing particular embodiments by way of example only and is not intended to be limiting of any claimed invention. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer to solutions, methods of making and using said solutions, devices and systems using said solutions, and methods of operating such devices and systems. That is, where the disclosure describes and/or claims a feature or embodiment associated with a solution, a composition comprising a solution, a method of making and using a composition or solution, a device or system using a composition or solution, or a method of operating such a device or system, it is appreciated that such a description and/or claim is intended to refer to all of these features or embodiment.

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

When a list is presented, unless stated otherwise, it is to be understood that each individual element of that list and every combination of that list is to be interpreted as a separate embodiment. For example, a list of embodiments presented as "A, B, or C" is to be interpreted as including the embodiments, "A," "B," "C," "A or B," "A or C," "B or C," or "A, B, or C."

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step or part may also be considered an independent embodiment in itself.

The present invention includes embodiments related to ferrocyanide/ferricyanide systems and use thereof. It also encompasses compositions/solutions and use embodiments of a more expansive nature. The inventors have discovered, for example, that certain mixed salts systems provide solubilities significantly higher than those of their corresponding single salt systems. For example, the present invention allows for solutions of metal cyanide complexes that exhibit higher concentrations of the cyanometallate ion than might be expected by one of ordinary skill in the art given the published solubility limits for the individual salts of interest.

Throughout this specification, words are to be afforded their normal meaning, as would be understood by those skilled the relevant art. However, so as to avoid misunderstanding, the meanings of certain terms will be specifically defined or clarified.

For example, as used herein, the term "charged metal-ligand coordination complex," or simply "coordination complex," refers to those complexes comprising a zero or non-zero valence transition metal (i.e., an element having filled or unfilled d-orbitals, including members of groups 3 to 12 in the periodic table, as well as members of the lanthanide and actinide series), having coordinated ligands, wherein the combination of the metal and ligands presents a non-zero charge, as would be understood by the skilled artisan. Unless otherwise specified, the term "coordinated ligands" refers to any chemical moiety within the coordination sphere of the metal. However, additional independent embodiments provide that these coordinated ligands are individually inorganic, organic, or mixed inorganic/organic, and are monodentate, bidendate, polydentate, or a combination thereof.

Also, unless otherwise specifically indicated, the term "counterion" is intended to connote those species whose formal charge sign is opposite to that of the coordination complex, and so is capable of balancing the charge of the metal-ligand coordination complex. Counterions include those species which can then stabilize or effect the formation of lattice crystals of the metal-ligand coordination complex. The term "formal charge" is used to reflect that, under certain conditions, the coordination complex and its associated counterions may exist in solution as ion pairs, rather than free ions, though this association does not detract from the intended meanings.

Still further, as used herein, reference to a "stable solution" refers to a solution that is stable with respect to precipitation. Note that the optional parenthetical "(stable)" preceding the term "solution," as used herein, is intended to connote individual embodiments comprising the solution and the solution which is stable with respect to precipitation. As is known in the art, a dissolved species in a solution that is stable to precipitation does not sediment spontaneously, and a number of tests may be relevant for determining the present or absence of a precipitate. For example, such a species cannot be collected on a 0.2 micron filter and typically forms symmetrical elution peaks when passed through a size exclusion chromatography column. A solution that is not stable to precipitation may include a gross two phase system with settled solids or a dispersion with a turbidity measurable against a Formazin Turbidity Unit (FTU) standard or an equivalent standard by known light scattering methods (e.g., ISO 7027:1999). Such stability testing may be done under any conditions deemed relevant for the intended use of the solution, but for present purposes, unless otherwise specified, the term "stable solution" should be taken to mean that the solution does not form a precipitate comprising the coordination complex, as detectable by any of the preceding methods, when the solution is left to stand at normal, ambient temperatures (e.g., in the range of from about 20° C. to about 25° C.) for about 30 days.

Additional individual embodiments also include those where the stability is defined at any given temperature in the range discussed below, for a time of at least about 1, 2, 3, 4, 5, 6, 7, 8, 9, 10, 20, 30, 40, 50, or about 100 days or about one 1, 2, or about 5 years. For example, in an additional embodiment, the solution is considered stable, if the solution does not form a precipitate comprising the coordination complex, as detectable either visually or by light scattering, when the solution is left to stand at a refrigerated temperature (e.g., in the range of from about 0° C. to about 4° C.) for 7 days.

As used herein, then, the term "solution stability" is not intended necessarily to refer to chemically stable solutions (i.e., resistant to chemical degradation), though this is a preferred characteristic of the stable solution.

Within these definitions, certain embodiments of the present invention provide for stable solutions, each of which comprises (or consists essentially of): (a) a charged metal-ligand coordination complex; and (b) at least two different counterions; the concentration of said coordination complex, at a given temperature, being higher than can be obtained when said coordination complex is in the presence of any single one of the at least two different counterions.

For example, for a system containing counterions A, B, and C, the solubility of the coordination complex in the presence of A, B, and C, is greater than the solubility limit of the coordination complex in the presence of only A, in the presence of only B, and in the presence of only C. For the sake of clarity, reference to "enhanced solubility" is intended to connote the condition where this condition is met. In this regard, this enhanced solubility is an essential feature, the basic and novel characteristic, of the invention. Therefore, where the embodiments described herein are described using the open-ended "comprising" language, such embodiments may be interpreted as also including those embodiments which may be described in terms of "consisting essentially of language," with this enhance solubility as the basic and novel characteristic. Also, as understood by the skilled artisan, the term "solubility limit" refers to the amount of material (in this case, the coordination complex and/or the ferro-/ferricyanide complex) that a solvent can hold at a given temperature before precipitation of the complex occurs; i.e., the point at which a certain material becomes saturated in the solvent, but not supersaturated.

It should be appreciated that, notwithstanding the use of the term "that can be obtained," the comparison between the coordination complex in the presence of "at least two different counterions" and in the presence of "any single one of the at least two different" is to be made between solutions having otherwise identical ingredients (e.g., additives) and under otherwise identical circumstances (e.g., including temperature).

Further, specific embodiments include those where this effect may exist whether there are two or more different counterions, including those situations where the counterions may be nominally associated with the coordination complex, but may also include ions from other materials added to the solution—e.g., associated with an added buffer or supporting electrolyte. The term "supporting electrolyte" is defined below.

As used herein, the term "solution" carries its normal meaning, as understood by one skilled in the art—i.e., homogeneous mixture of a solid dissolved in a liquid. However, as used herein, the term "solution" is not intended to be read as necessarily requiring the absence of other, non-dissolved materials, or a that the solution is the continuous phase of a mixture. That is, in the present context, a "(stable) aqueous solution of iron hexacyanide" would also be present in a mixture comprising particles suspended within a (stable) aqueous solution of the iron hexacyanide and/or an emulsion or microemulsion in which the continuous or discontinuous phase comprises the (stable) aqueous solution.

Further, in addition to the coordination complex (including the iron hexacyanides) and the at least two counter-ions, a (stable) solution may further comprise other ionizing or non-ionizing materials, which make it more suitable for its intended application, but which do not interfere with the basic and novel characteristic of the invention. Ionizing materials (i.e., those with partially or completely ionize or form ion pairs in solution) may include, for example, supporting electrolytes (defined below), buffering agents, ionic (anionic, cationic, and zwitterionic) surfactants or detergents, and/or colligative property or pH adjusters. Exemplary ionizing materials include, but are not limited to, strong or weak acids (including hydrochloric, nitric, phosphoric, sulfuric, or carboxylic acids, such as acetic, citric, amino acids, or EDTA) and bases (including hydroxides, amines, and the conjugate bases of the aforementioned acids); alkali metal, alkaline earth metal, or ammonium salts; and salts of carboxylates (including acetic acid, citric acid, and EDTA), borates, halides (including bromide, chloride, fluoride, and iodide), nitrates, nitrites, sulfates, sulfites, phosphates, hydrogen phosphates, phosphites, polyphosphates. Exemplary buffering agents include acetic acid, bicine, cacodylate buffer, CHES (2-(cyclohexylamino)-ethanesulfonic acid), citric acid, HEPES (4-(2-hydroxyethyl)-1-piperazine-ethanesulfonic acid), MES (2-(N-morpholino) ethanesulfonic acid), MOPS (3-(N-morpholino) propanesulfonic acid), PIPES (piperazine-N,N'-bis(2-ethanesulfonic acid)), SSC (saline-sodium citrate buffer), TAPSO (3-[[1,3-dihydroxy-2-(hydroxymethyl)propan-2-yl] amino]-2-hydroxypropane-1-sulfonic acid), TRIS (2-amino-2-hydroxymethyl-propane-1,3-diol), and tricine The solutions may also contain non-ionizing materials, for example non-ionic co-solvents (including water miscible or soluble alcohols, including $C_{1-3}$ alcohols, glycols, or polyglycols; ketones; or aldehydes), viscosity modifiers or gelling agents (including citrate, corn starch, corn syrup, gelatin, glycerol, guar gum, pectin), and/or wetting agents (including non-ionic surfactants and/or detergents).

Again, to the extent that these added materials effect solubility of the coordination complex, it should be appreciated that any comparison between the enhanced solubility of the coordination complex in the presence of the at least two types of counterions and the single counter-ion should be made under the same compositional conditions.

Within the context of this invention, the (stable) solution is preferably, though not necessarily, aqueous. Unless otherwise specified, the term "aqueous" refers to a solvent system comprising at least about 98% by weight of water, relative to total weight of the solvent. However, in many applications, soluble, miscible, or partially miscible (emulsified with surfactants or otherwise) co-solvents may also be usefully present which, for example, extend the range of water's liquidity (e.g., alcohols/glycols). When specified, additional independent embodiments include those where the "aqueous" solvent system comprises at least about 55%, at least about 60 wt %, at least about 70 wt %, at least about 75 wt %, at least about 80%, at least about 85 wt %, at least about 90 wt %, at least about 95 wt %, or at least about 98 wt % water, relative to the total solvent. It many situations, the aqueous solvent may consist of water, and be substantially free or free of co-solvents.

While the invention includes embodiments where the (stable) solutions are alternatively alkaline, acidic, or substantially neutral, in certain preferred embodiments (e.g., including solutions of ferro-/ferricyanide), the (stable) solutions of the coordination complexes are alkaline. As used herein, unless otherwise specified, the term "alkaline" refers to a solution having an apparent pH in excess of about 7. The term "apparent" is used to accommodate solvent systems that are free of or contain a co-solvent, but (in the latter case) which register a pH in excess of about 7 when interrogated with a pH meter (pH meter being exemplified by a device in which a voltmeter measures the potential difference between a reference electrode and a sense electrode held in ionic contact with the solution of interest). While the term "alkaline" refers to a solution having an apparent pH in excess of 7, other embodiments of the invention include those where the pH or apparent pH is in the range of about 7 to about 14, and those where the pH or apparent pH is nominally greater than 14 (i.e., highly alkaline systems—including multi-molar (e.g., 2 M) hydroxides). Additional independent embodiments also include those solutions in which the pH is at least about 7.5, 8, 8.5, 9, 9.5, 10, 11, 12, 13, or about 14 pH units (and upper end uncapped) and in which the pH is less than about 14, 13.5, 13, 12.5, 12, 11.5, or 11 pH units; with exemplary ranges also including about 7-14, 8-13, 9-13, 10-13, 8-12, 8-11, and 9-12 pH units.

In certain embodiments, the non-zero charge associated with the coordination complex is negative (i.e., the coordination complex itself is anionic), in which case the relevant at least two counterions (giving rise to the enhanced solubility) are each positively charged (i.e., are cationic). These cationic counterions may comprise species having any number of formal positive charges, including mixtures of species carrying different positive charges, though mono- and di-cationic (including alkali and alkaline earth metal cations) species, or mixtures thereof, are preferred. In other preferred embodiments, the cationic counterions are mixtures of mono-valent cations, for example, alkali metal or optionally substituted (e.g., $NH_4^+$ or mixed hydrogen, alkyl, aryl) ammonium cations. Combinations comprising $Na^+$ and $K^+$ appear to be most preferred, at least for the ferro-/ferricyanide system.

In other embodiments, the non-zero charge associated with the coordination complex is positive. Where the coordination complex carries a positive charge, then, the associated counterions are anionic. In this case, various embodiments provide that the counterions may each independently carry any number of formal negative charges, including singly, doubly, or triply charged anionic species, or mixtures thereof. Such species may include, but are not limited to, chalcogenides, halides (including $F^-$, $Cl^-$, $Br^-$, $I^-$), hexa-alkyl or -aryl phosphates, hexafluorophosphate, nitrate, nitrite, perchlorate, phosphate, hydrogen phosphates, phosphonates, sulfate, sulfite, tetra-alkyl or -arylborates, tetrafluoroborates, or triflates.

In certain preferred embodiments, the (stable) solution comprises only two types of counterions. Within these embodiments are included those embodiments wherein the molar ratio of the first and second of these counterions, independent of charge on each counterion, is in the range of from about 1:10 to about 10:1, with respect to one another. In other independent embodiments, this ratio is in the range of from about 1:8 to about 8:1, about 1:6 to about 6:1, from about 1:4 to about 4:1, about 1:3 to about 3:1, about 1:2 to about 2:1, about 1:1.5 to about 1.5:1, or substantially 1:1 (the term "substantially allowing for experimental error in measuring the salts or drift which may occur during the use of the solution). In those cases where the (stable) solution comprises more than two types of counterions, additional embodiments provide that at least one pair of the counterions satisfy the criteria set forth in this paragraph.

The enhanced stability of the coordination complex in the presence of at least two counterions is described above in terms of "a given temperature;" i.e., "at a given temperature, the concentration of said coordination complex in the (stable) solution is higher than the solubility of said coordination complex, when said coordination complex is in solution with any single one of the at least two different counterions." This description is intended to connote both that the comparison between the solubilities is being made at a single (and the same) temperature, and that this condition of enhanced solubility is satisfied if present at any temperature. In many contexts, a determination of this "given temperature" is made at normal ambient, room temperature (i.e., in the range of from about 20° C. to about 25° C.), simply for the sake of convenience in measuring the solubilities. However, in other applications such a determination may be made at any temperature in the range of from about −20° C. to about 150° C. In other embodiments, this temperature is one in the range bounded at the lower end by a temperature of about −10° C., about 0° C., about 10° C., about 20° C., about 30° C., or about 40° C., and at the upper end by a temperature of about 90° C. 80° C. 70° C., 60° C., 50° C., or about 40° C. Exemplary embodiments include, but are not limited to, those in the range of from about −10° C. to about 60° C., about 40° C. to about 80° C., or about 10° C. to about 30° C.

The (stable) solutions may also be described in terms of the enhancement of solubility which arises from the presence of the plurality ("at least two types") of counterions. In certain embodiments, then, the (stable) solution provides a concentration of the coordination complex which is at least about 10% higher than the solubility limit of said coordination complex, when said coordination complex is in solution in the presence of any and only one of the at least two types of counterions. In other independent embodiments, the concentration of the coordination complex is at least about 25% higher, at least about 50% higher, at least about 75% higher, or at least about 100% higher than the solubility limit of said coordination complex, when said coordination complex is in solution in the presence of any and only one of the at least two types of counterions.

To this point, the coordination complex has been described only in terms of a charged complex comprising a transition metal having coordinated ligands. In certain embodiments, the coordination complex is redox active. That is, in separate embodiments, the coordination complex is capable of undergoing oxidation, reduction, or both oxidation and reduction, with the application of electric current (or a voltage to a suitable electrode surface in contact with a solution comprising the coordination complex) or an appropriate chemical oxidizing agent or reducing agent. In this context, the term "redox active" means that the coordination complex exhibits an oxidation or reduction potential, in aqueous solution, in the range of from about −0.8 V to about 1.8 V vs. RHE.

The iron hexacyanide system provides specific embodiments within this invention. That is, certain additional embodiments include those wherein the coordination complex is an iron hexacyanide and two of the at least two types of counterions are alkali metal cations. The iron hexacyanide can be ferricyanide, ferrocyanide, or a mixture of ferri-/ferrocyanide. These alkali metal ions may include $Li^+$, $Na^+$, $K^+$, or $Cs^+$. All of the embodiments and composition and parametric options described above for the solutions comprising coordination complexes are also considered to be available and useable independently in solutions and options described for solutions comprising iron hexacyanide.

In certain preferred embodiments comprising an iron hexacyanide, the solutions, preferably stable solutions, are aqueous, comprising two types of counterions, those two type of counterions being $Na^+$ and $K^+$, present in the ranges described above for counterions (i.e., including the range of from about 1:10 to about 10:1, about 1:5 to about 5:1, about 1:4 to about 4:1, about 1:3 to about 3:1, about 1:2 to about 2:1, about 1:1.5 to about 1.5:1, or substantially 1:1). An alkaline aqueous solution, free or substantially free of co-solvents, comprising iron hexacyanide (eitherferricyanide, ferrocyanide, or a mixture of ferri-/ferrocyanide) and a substantially equimolar mixture of $Na^+$ and $K^+$ is most preferred.

In further embodiments, the coordination complex, and particularly the iron hexacyanide, is present in a (stable) solution in a concentration of at least about 0.8 M. In additional independent embodiments, the concentration of the iron hexacyanide is at least about 0.9 M, about 1 M, about 1.2 M, about 1.3 M, about 1.4 M, or at least about 1.5 M, and up to about 3 M, 2.5 M, 2 M, 1.75 M, 1.5 M, or about 1 M. One exemplary, non-limiting embodiment includes a solution wherein the iron hexacyanide, is present in a concentration in a range of from about 1 M to about 3 M.

The present invention(s) further comprises methods of preparing the solutions, preferably stable aqueous solutions of iron hexacyanide, having enhanced solubility. Some of these are described in the following paragraphs. In addition to those embodiments specifically described, it should be appreciated that these teachings may be combined to provide additional embodiments, each of which is deemed within the scope of the present invention. Also, for the sake of clarity, all solutions or compositions which may result from the below-described methods are considered separate embodiments of the present invention. For example, the molar ratios of the iron hexacyanide salts may be in any ratio so as to satisfy the basic and novel characteristic of enhanced solubility, including those discussed above, although intermediate ratios, including ca. 0.9:1 to about 1.1:1 or substantially 1:1 are preferred. Similarly, the solutions having enhanced solubilities of iron hexacyanide may be substantially neutral or alkaline. A preference for any of these options depends on the intended use of the solution.

In a first strategy, certain embodiments provide methods of preparing aqueous solutions, preferably stable aqueous solutions of iron(II) hexacyanide, $[Fe(CN)_6^{4-}]$, each method comprising dissolving sufficient amounts of $Na_4[Fe(CN)_6]$ and $K_4[Fe(CN)_6]$ in an amount of aqueous solvent (preferably water substantially free of co-solvents), so as to provide a concentration of $Fe(CN)_6^{4-}$ in said solution, at a given temperature, that exceeds the concentration of $Fe(CN)_6^{4-}$ in either a saturated solution of $Na_4[Fe(CN)_6]$ or a saturated solution of $K_4[Fe(CN)_6]$, at the same temperature. This "boosting" of solubility of $Fe(CN)_6^{4-}$ in solution, by "dissolving sufficient amounts of $Na_4[Fe(CN)_6]$ and $K_4[Fe(CN)_6]$ in an amount of aqueous solvent (preferably water substantially free of co-solvents)" may be accomplished by (a) co-mixing solid salts of $Na_4[Fe(CN)_6]$ and $K_4[Fe(CN)_6]$ with the aqueous solvent; (b) by admixing a solid salt of $Na_4[Fe(CN)_6]$ with a solution (including a saturated solution) of $K_4[Fe(CN)_6]$; or (c) by admixing a solid salt $K_4[Fe(CN)_6]$ with a solution (including a saturated solution) of $Na_4[Fe(CN)_6]$. While solid salts of $Na_4[Fe(CN)_6]$ and $K_4[Fe(CN)_6]$ include anhydrous forms and any hydrate or solvate thereof, $Na_4Fe(CN)_6 \cdot 10H_2O$ and $K_4Fe(CN)_6 \cdot 3H_2O$ are preferred starting materials with these methods. This "boosting" methodology may also be applied to the methods which follow.

Where an alkaline solution is desired, additional embodiments of these methods further include adding a sufficient amount of an appropriate base (i.e., so as to maintain the enhanced solubility) to effect and maintain the desired pH or pH range.

As just described, the enhanced solubility available by this strategy, or the other strategies described herein, may be realized by the presence of the $Na^+/K^+$ counterions as provided by the salts of the starting materials themselves. But since the enhanced solubility appears to be attributable by the total counterion population in the resulting solution, such may be also realized by the addition/presence of other dissolved salts. For example, in related embodiments, (stable) aqueous solutions of iron(II) hexacyanide, $[Fe(CN)_6^{4-}]$ may be prepared by dissolving sufficient amounts of $Na_4[Fe(CN)_6]$ and/or $K_4[Fe(CN)_6]$ in an amount of solvent comprising $Na^+/K^{+-}$ containing salts, which combination provides the necessary plurality of counterions, in a solution environment, which yields the enhanced solubility. Exemplary $Na^+/K^+$ containing salts include, but are not limited to sodium and/or potassium chloride, carbonate, hydroxide, hydrogen phosphate, nitrate, or sulfate.

In a second strategy, mixtures of basic $Na^+/K^{+-}$ salts may be reacted with $H_4[Fe(CN)_6]$, yielding solutions of enhanced $[Fe(CN)_6^{4-}]$ solubility, with the concomitant change in solution pH. For example, other embodiments provide methods of preparing aqueous solutions, preferably stable aqueous solutions of iron(II) hexacyanide $(Fe(CN)_6^{4-})$, each method comprising mixing sufficient amounts of $H_4[Fe(CN)_6]$, NaOH, and KOH in sufficient water, so as to provide a concentration of $Fe(CN)_6^{4-}$ in said solution, at a given temperature, that exceeds the concentration of $Fe(CN)_6^{4-}$ in either a saturated solution of $Na_4[Fe(CN)_6]$ or a saturated solution of $K_4[Fe(CN)_6]$, at the same temperature. Further embodiments using this strategy include those where other basic $Na^+/K^{+-}$ salts—e.g., carbonates or bicarbonate—are substituted in whole or in part for the hydroxides.

In a third strategy, sufficient amounts of a calcium salts of iron(II) hexacyanide $[Fe(CN)_6^{4-}]$ are reacted with mixtures of basic $Na^+/K^+$-salts under conditions which yield solutions of enhanced $[Fe(CN)_6^{4-}]$ solubility, with the concomitant precipitation (and subsequent removal) of an insoluble calcium salt. For example, one such series of embodiments provides methods of preparing aqueous solutions, preferably stable aqueous solutions of iron(II) hexacyanide $(Fe(CN)_6^{4-})$, each method comprising: (a) mixing sufficient amounts of $Ca_2[Fe(CN)_6]$, NaOH, and KOH in an amount of water, so as to provide a concentration of $Fe(CN)_6^{4-}$ in said solution, at a given temperature, that exceeds the concentration of $Fe(CN)_6^{4-}$ in either a saturated solution of $Na_4[Fe(CN)_6]$ or a saturated solution of $K_4[Fe(CN)_6]$, at the same temperature; and (b) removing precipitated $Ca(OH)_2$. Further embodiments using this strategy include those where mixed calcium salts—e.g., $CaNa_2[Fe(CN)_6]$ or $CaK_2[Fe(CN)_6]$—are substituted in whole or in part for the $Ca_2[Fe(CN)_6]$, where other basic $Na^+/K^{+-}$ salts—e.g., carbonates or bicarbonate—are substituted in whole or in part for the hydroxides, and where the precipitated calcium salt (be it calcium carbonate or hydroxide) is removed.

While other methods may be used, the step of removing precipitated calcium salt(s) may be accomplished using, for example, centrifugation and/or (ultra) filtration techniques.

Specific additional embodiments provide solutions, each solution comprising (or consisting essentially of) a aqueous alkaline solution, preferably a stable aqueous alkaline solution comprising iron(II) hexacyanide $(Fe(CN)_6^{4-})$, wherein the concentration of $Fe(CN)_6^{4-}$ in said solution, at a given temperature and pH, exceeds the concentration of $Fe(CN)_6^{4-}$ in either a saturated aqueous alkaline solution of $Na_4[Fe(CN)_6]$ or a saturated aqueous alkaline solution of $K_4[Fe(CN)_6]$, at the same temperature and pH.

It should be appreciated that the descriptions provided above for the preparation of solutions of iron(II) hexacyanide $[Fe(CN)_6^{4-}]$ also provide analogous methods for preparing solutions of enhanced solubility of iron(III) hexacyanide $[Fe(CN)_6^{3-}]$. This may be accomplished, for example by substituting the corresponding iron(III) hexacyanide $[Fe(CN)_6^{3-}]$ precursor for the iron(II) hexacyanide $[Fe(CN)_6^{4-}]$ described above. In an exemplary, but non-limiting, analogy, certain embodiments provide methods of preparing aqueous solutions, preferably stable aqueous solutions of iron(III) hexacyanide $[Fe(CN)_6^{3-}]$, each method comprising dissolving sufficient amounts of $Na_3[Fe(CN)_6]$ and $K_3[Fe(CN)_6]$ in an amount of water, so as to provide a concentration of $Fe(CN)_6^{3-}$ in said solution which meets the criteria of enhanced solubility (i.e., a concentration of $Fe(CN)_6^{3-}$ greater than allowed by the solubility limits of $Na_3[Fe(CN)_6]$ and $K_3[Fe(CN)_6]$ themselves). These methods may include analogous methods of "boosting" as described above for the iron(II) system, wherein the solid salts of $Na_3[Fe(CN)_6]$ and $K_3[Fe(CN)_6]$ may include anhydrous forms and any hydrate or solvate thereof.

In another approach, solutions of iron(III) hexacyanide $[Fe(CN)_6^{3-}]$ may be prepared by oxidizing solutions of iron(II) hexacyanide $[Fe(CN)_6^{4-}]$, either electrochemically or chemically, using appropriate reagents known in the art. Similarly, solutions of iron(II) hexacyanide $[Fe(CN)_6^{4-}]$ may be prepared by chemically or electrochemically reducing solutions of iron(III) hexacyanide $[Fe(CN)_6^{3}]$. When prepared in this way, the solutions resulting from, or compositionally equivalent to, the complete or partial oxidation/reduction of the corresponding precursor (i.e., mixed iron (II/III) systems) are also considered to be within the scope of the present invention.

The principles described herein, as well as the solutions derived from these principles and comprising a charged metal-ligand coordination complex, generally, and iron hexacyanides, specifically, may be used in a wide variety of applications, including but not limited to energy storage; energy conversion; metal extraction from ores or other matrices; electro- and electroless plating; providing soluble sources of cyanide or nitric oxide; electrochemical sensor technology; device calibration by electrochemical, spectroscopic, or magnetic means; the production of safety paper and other inks, dyestuffs, or dye formulations; animal feed supplements; electrochromics; and anti-caking agents. The invention is relevant to processes involving soluble cyanometallates and those processes involving non-solution-based uses, such as colloids, thin films, amorphous, or crystalline materials. The use of such solutions in each of these applications is considered to be within the scope of the present invention.

Further, the specific requirements of each application may require or prefer additional additives or components. For example, solutions useful for energy storage and electro-/electroless plating typically require additional buffering agents, supporting electrolytes, viscosity modifiers, wetting agents, etc.

Certain embodiments provide solutions useful as electrolytes, each solution comprising (or consisting essentially of) any of the (stable) solutions described herein, and further comprising a supporting electrolyte. The term "supporting electrolyte" is well-known in the arts of electrochemistry and energy storage, and is intended to refer to any species which is redox inactive in the window of electric potential of interest and aids in supporting charge and ionic conductivity. In the present case, a supporting electrolyte does not substantially compromise the solubility of the coordination complex (including iron hexacyanide complexes). Examples include salts comprising an alkali metal, ammonium ion including an ammonium ion partially or wholly substituted by alkyl or aryl groups, halide (e.g., Cl$^-$, Br$^-$, I$^-$), chalcogenide, phosphate, hydrogen phosphate, phosphonate, nitrate, sulfate, nitrite, sulfite, perchlorate, tetrafluoroborate, hexafluorophosphate, or a mixture thereof, and others known in the art. In the case of the ferro-/ferricyanide chemistry, sodium potassium hydrogen phosphate is a particularly useful supporting electrolyte.

In these embodiments, the coordination complex (including the iron hexacyanide complex) may be redox active within the operating window of electric potential of interest. In such embodiments, the coordination/iron hexacyanide complex acts, or is capable of acting, as the energy storage medium.

The solutions of the present invention, and in particular the enhanced solubility of the inventive iron hexacyanide complex solutions allows for substantially higher theoretical charge/discharge densities for energy storage devices, including flow batteries, than previously available with iron hexacyanide. The present invention enables the production and use of solutions of high concentrations of metal cyanide complexes that are stable in pH ranges unavailable to those making use of the higher solubility of an alkaline earth metal salt relative to the solubilities of alkali metal salts. The latter counterions enable stable alkaline solutions, but they do not enable concentrations greater than about 0.8 M using the methods known in the art, and reports of 0.5-0.6 M at ambient temperatures are the norm. This is limiting in applications where higher concentrations may be beneficial. These applications include energy storage, where a 0.8 M solution of [Fe(CN)$_6$]$^{4-}$ represents a theoretical charge/discharge density of only 21.4 Ah/L, but the 1.5 M solution described herein enables 40.2 Ah/L. The term "theoretical charge density" is used to describe the maximum charge/discharge density for a given system, based on the relationship that a 1 M solution of a 1 electron active species provides 26.8 A-h/L and scales directly with concentration. Such a description avoids any consideration of device inefficiencies deriving from other means, as would be reflected in an experimentally derived "practical" charge density consideration. Accordingly, certain independent embodiments of the present invention provide a (stable) solution or electrolyte comprising iron(II) hexacyanide, iron(III) hexacyanide, or a mixture of iron(II) hexacyanide and iron(III) hexacyanide capable of exhibiting a theoretical charge/discharge density of at least about 20 A-h/L, at least about 25 A-h/L, at least about 30 A-h/L, at least about 35 A-h/L, at least about 40 A-h/L, at least about 45 A-h/L, or at least about 50 A-h/L. Using the scaling factor just described, this corresponds to iron hexacyanide concentrations on the order of at least 0.8 M, 1 M, 1.1 M, 1.2 M, 1.3 M, 1.4 M, 1.5 M, 1.75 M, or about 2 M.

The enhanced solubilities of the coordination/iron hexacyanide complex as described herein may provide solutions which are useful simply for the high ionic conductivity made available by the present invention, independent of any redox character that the complex may or may not exhibit or be capable of exhibiting. For example, ferrocyanide, by itself, is quite conductive, especially at the high concentrations now made available by the present invention. For example, at pH 11, the concentrated aqueous sodium/potassium solutions of [Fe(CN)$_6$] (e.g., >1 M) are at least as conductive as the corresponding sodium sulfate solutions.

As a result, the user may wish to choose conditions in which the operating window of the electric potential of interest is outside of the electric potential of the coordination/iron hexacyanide complex couple. In such cases, it may be useful to add a species which is redox active within the operating window of interest.

Accordingly, in some embodiments, the electrolyte may comprise any one of the solutions already discussed, and further comprise an additional redox active species. The additional redox active "species" may or may not comprise a transition metal (e.g., may be entirely organic). Use of the term "additional" redox active species acknowledges the fact that the coordination complex within the (stable) solutions may or may not already be redox active, or have a redox potential that is outside the operating window of electric potential to which the electrolyte is to be exposed. That is, these embodiments describe solutions which may actually comprise two redox active couples (the coordination complex/iron hexacyanide complex being the first and the "additional" redox active species being the second) each operable within the range of from about −0.8 V to about 1.8 V, vs. RHE, but the "additional" species operable at a different potential than the coordination complex/iron hexacyanide complex, such that, under certain operating conditions, the enhanced solubility coordination/iron hexacyanide complex may act simply as the supporting electrolyte, while the "additional" redox active species is acting as part of a redox active couple.

The present invention also contemplates those devices, systems, and applications which take advantage of the enhanced solubilities provided by these inventive solutions. For example, independent embodiments of the present invention include those electrochemical cells or half-cells, including those associated with flow batteries, which use or incorporate one of the solutions described herein. For example, solutions based on the ferro-/ferricyanide couple are known to be useful used in zinc ferro-/ferricyanide systems, but their historic utility has been limited by the limited solubilities of sodium ferro-/ferricyanide. See, e.g., Hollandsworth, R. P., et al., "Zinc/ferrocyanide Battery Development Phase IV" Lockheed Missiles and Space Company, Inc., contractor report, Sandia Contract DE-AC04-76DP00789, 1985; and US Application Publication No. 2011/0244277 (to Gordon, et al.), each of which is incorporated by reference in its entirety for all purposes. These two references describe a series of technologies and strategies intended to improve the performance of such zinc ferro-/ferricyanide systems, and each of these technologies and strategies would benefit when incorporating the high concentrations of the ferro-/ferricyanides solutions available by the present invention. Any design, apparatus, and/or operating condition available by combining the teachings of the Hollandsworth and Gordon references with the present disclosure is within the scope and are considered embodiments of the present invention.

The electrochemical cells of the present invention, including those electrochemical cells which operate as a flow battery cell, and which take advantage of the enhanced solubility of the coordination complexes, generally, and the ferro-ferricyanide complexes, specifically, may also be configured into larger systems, for example using a cell stack arrangement. Such systems, which include at least one electrochemical/flow battery cell as described herein, are considered additional embodiments of the present invention.

Also considered within the scope of the present invention are those methods useful for operating such an electrochemical/flow battery cell or energy storage system. For example, various embodiments provide methods of operating an electrochemical/flow battery cell or an energy storage system which comprise a solution described herein, each method comprising passing a current through said solution so as to effect a change in the oxidation state of the coordination complex. Additional embodiments provide methods of operating an electrochemical/flow battery cell or an energy storage system comprising a solution described herein, each method comprising passing a current through said solution so as to effect a change in the oxidation state of an iron hexacyanide complex.

EXAMPLES

Example 1

Preparation of Sample

Figure 2A:
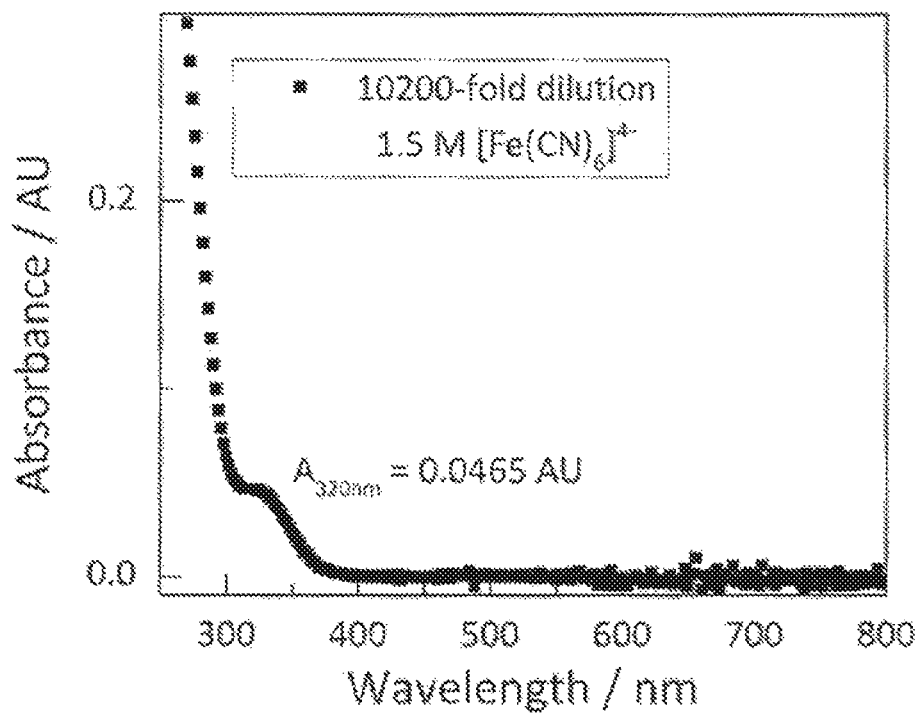
FIG. 2A and FIG. 2B are UV/visible spectra of diluted samples of 1.5 M $[Fe(CN)_6]^{4-}$ as described in Example 1.
Figure 2B:
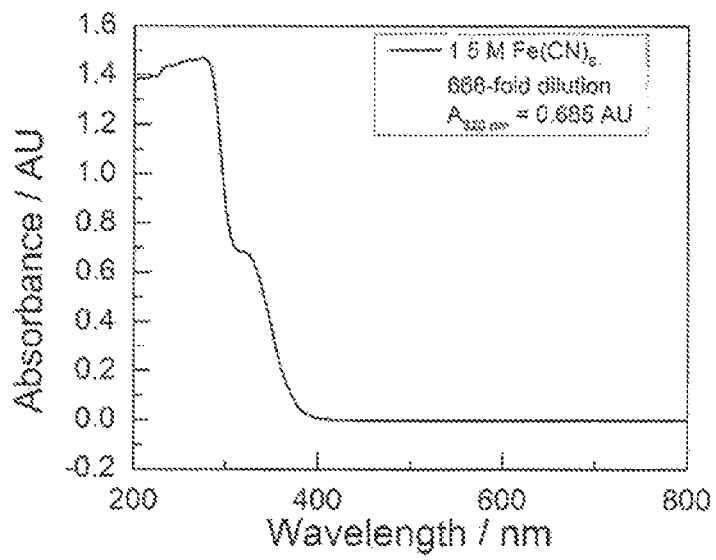

In an exemplary embodiment, solid $Na_4Fe(CN)_6 \cdot 10H_2O$ (33.89 g, 0.070 mol) and $K_4Fe(CN)_6 \cdot 3H_2O$ (29.57 g, 0.070 mol) were stirred in 80 mL deionized water. To dissolve the solids, sufficient water was then slowly added to provide a sample containing ca. 1.5 M of $Fe(CN)_6^{4-}$. This solubility was unexpected given that the solubilities of $Na_4Fe(CN)_6 \cdot 10H_2O$ and $K_4Fe(CN)_6 \cdot 3H_2O$ are each known in the art to be less than 0.7 M at the same ambient temperatures. The concentration of dissolved $Fe(CN)_6^{4-}$ ion in this sample was confirmed by UV/visible light spectroscopy as follows. An aliquot of the 1.5 M $Fe(CN)_6^{4-}$ solution (20 μL) was added to 2.0 mL of deionized water, resulting in a dilution factor of 101. The resulting solution was similarly diluted by a factor of 101 with water to provide a solution having a $Fe(CN)_6^{4-}$ concentration of ca. $1.5 \times 10^{-4}$M (total dilution 1/101×1/101~1/10200) which was analyzed by UV/visible light spectroscopy using a 1 cm path-length quartz cuvette. FIG. 1 shows a reference spectrum, plotted by molar extinction coefficient for the ferrocyanide anion, which was prepared by dissolving a sufficient quantity of $Na_4Fe(CN)_6 \cdot 10H_2O$ to give 100.0 mL of a 0.10 M solution and diluting appropriately for spectrophotometric analysis. FIG. 2A shows the spectrum obtained for 10200-fold dilution (i.e., two series dilutions of a factor of 1:101) of the concentrated $Fe(CN)_6^{4-}$ solution. The spectrum of the diluted sample yielded an absorbance of 0.046 AU at 320 nm, corresponding to a molar extinction coefficient at this wavelength of ca. 315 $M^{-1}$ $cm^{-1}$, and in good agreement with the value derived from the reference spectrum and literature values. (See, e.g., Cohen, S. R., Plane, R. A., J. Phys. Chem., 1957, 61, 1096-1100). FIG. 2B shows a spectrum obtained using only a 668-fold dilution, yielding a molar extinction coefficient which is within experimental error of equivalent.

The concentrated mixed cation $Fe(CN)_6^{4-}$ exhibited good solution stability, showing no signs of precipitated solid or color change after standing at ambient room temperature (ca. 20° C. to about 25° C.) of 4 weeks or in refrigerated conditions (ca. 0 to 4° C.) for one week.

Example 2

Cyclic Voltammetry

Figure 3:
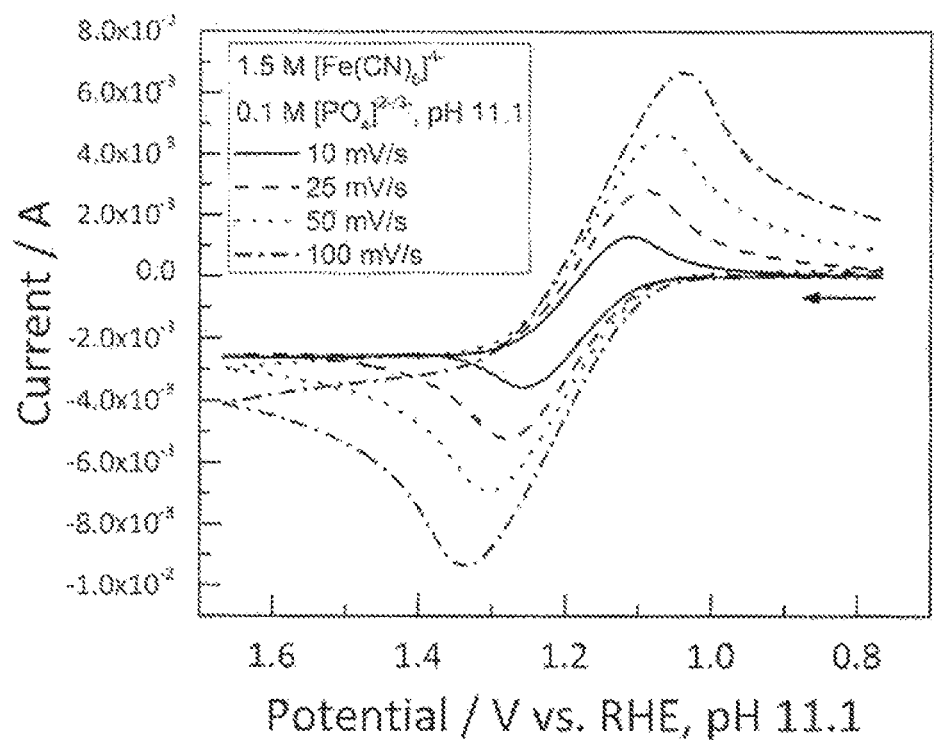
FIG. 3 shows the cyclic voltammogram of 1.5 M $[Fe(CN)_6]^{4-}$ obtained at a glassy carbon disk working electrode at several scan rates using 0.1 M sodium potassium hydrogen phosphate as the supporting electrolyte, as described in Example 2. The ratio of $Na^+/K^+$ counterions in this example is ca. 1:1.
Figure 5:
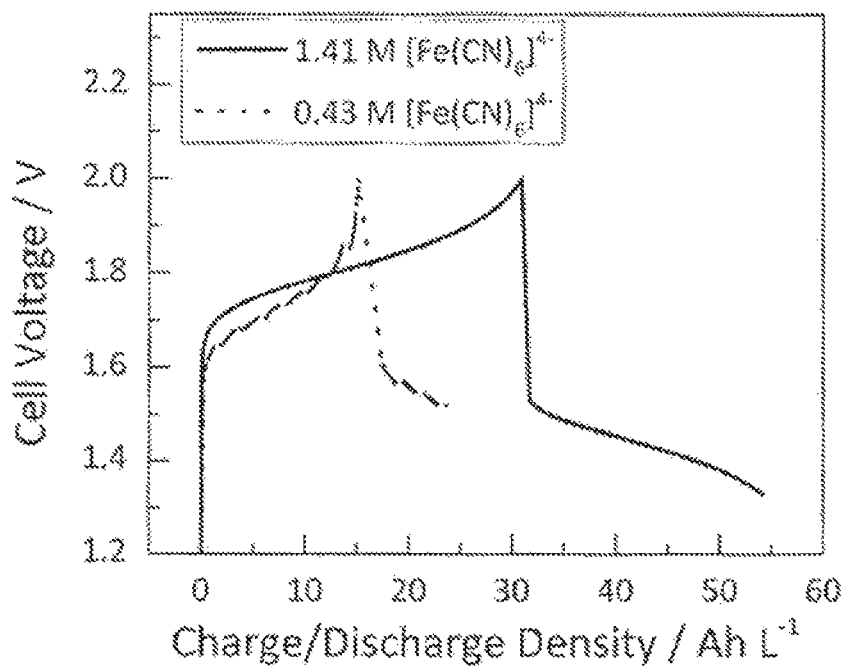
FIG. 5 shows the increased charge/discharge capacity enabled in an energy storage system using concentrated solutions of $[Fe(CN)_6]^{4-}$ in accordance with Example 3. The ratio of $Na^+/K^+$ counterions in this example is ca. 1:1.

The 1.5 M $[Fe(CN)_6]^{4-}$ solution described in Example 1 was interrogated by cyclic voltammetry, using a glassy carbon working electrode. FIG. 3. In these experiments, sufficient solid sodium potassium hydrogen phosphate, NaOH, and KOH was added to the 1.5 M $[Fe(CN)_6]^{4-}$ solution to yield a working solution having a pH of 11.1 (ratio $N^+/K^+$~1) and containing 1.5 M $[Fe(CN)_6]^{4-}$ and 0.1 M phosphate. These results are consistent with cyclic voltammograms obtained for more dilute solutions of $[Fe(CN)_6]^{4-}$. See, e.g., Pharr, C. et al., Anal. Chem. 1997, 69, 4673-4679 (FIG. 5, showing CV results from 10 mM ferro-/ferricyanide solution).

Figure 4:
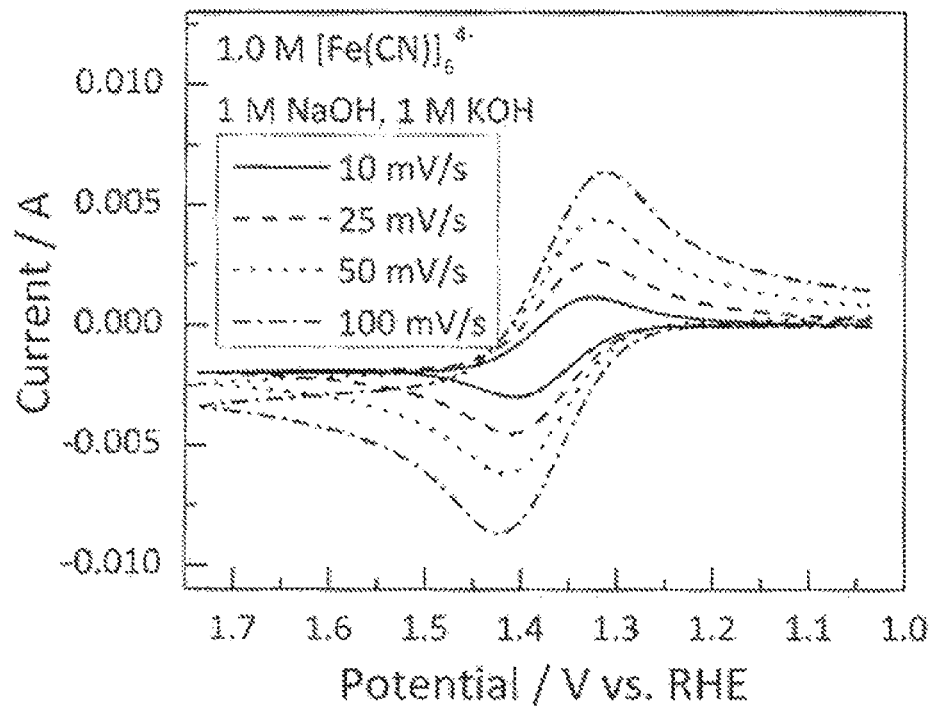
FIG. 4 shows the cyclic voltammogram of 1.0 M $[Fe(CN)_6]^{4-}$ obtained at a glassy carbon disk working electrode at several scan rates with 2 M hydroxide supporting electrolyte. The ratio of $Na^+/K^+$ counterions in this example is ca. 1:1.

In another experiment, $Na_4Fe(CN)_6 \cdot 10H_2O$ (3.39 g, 0.0070 mol) and $K_4Fe(CN)_6 \cdot 3H_2O$ (2.96 g, 0.0070 mol) were stirred in 10 mL water that was 1 M in NaOH and 1 M in KOH. After several hours of stirring, the small amount of solid remaining is removed by filtration. When analyzed by UV/Visible light spectroscopy in a procedure analogous to that outlined above, the total $[Fe(CN)_6^{4-}]$ was determined to be 1.0 M, significantly higher than the ~0.6 M concentrations reported upon saturating 2 M NaOH with $Na_4Fe(CN)_6 \cdot 10H_2O$. The electrochemical activity was retained in highly conductive, highly alkaline solutions, as shown in FIG. 4.

Example 3

Energy Storage Capacity

The energy storage capacities of solutions having enhanced concentrations of the iron hexacyanide were studied by standard methods, using an electrochemical cell having a 5 $cm^2$ active area. The results shown in FIG. 5 compare the storage capacity of a positive electrolyte at pH of 11 comprising a 0.43 M solution of $Na_4Fe(CN)_6$ with those of a 1.41 M solution prepared by dissolving $Na_4Fe(CN)_6$ and $K_4Fe(CN)_6$ when an appropriate quantity of a negative electrolyte is used in both cases so that the latter does not limit the capacity of the system. The 0.43 M ferrocyanide solution yielded a theoretical charge/discharge density of 11.5 Ah/L, and the 1.41 M solution yielded a value of 37.8 Ah/L. A solution of 1.5 M ferrocyanide yields a theoretical charge/discharge density of 40.2 Ah/L.

As those skilled in the art will appreciate, numerous modifications and variations of the present invention are possible in light of these teachings, and all such are contemplated hereby. For example, in addition to the embodiments described herein, the present invention contemplates and claims those inventions resulting from the combination of features of the invention cited herein and those of the cited prior art references which complement the features of the present invention. Similarly, it will be appreciated that any described material, feature, or article may be used in combination with any other material, feature, or article, and such combinations are considered within the scope of this invention. The disclosures of each patent, patent application, and publication cited or described in this document are hereby incorporated herein by reference, each in its entirety, for all purposes.

What is claimed is the following:

1. A method comprising:
   dissolving $Ca_2[Fe(CN)_6]$, NaOH and KOH in water, to produce an aqueous solution having a concentration of $Fe(CN)_6^{4-}$ in the aqueous solution that exceeds a concentration of $Fe(CN)_6^{4-}$ in either a saturated aqueous solution of $Na_4[Fe(CN)_6]$ or a saturated aqueous solution of $K_4[Fe(CN)_6]$ in water at a same temperature as that of the aqueous solution,
   wherein the aqueous solution is interconvertible between a ferricyanide state and a ferrocyanide state without forming a precipitate in either state.

2. The method of claim 1, further comprising removing precipitated $Ca(OH)_2$ from the aqueous solution.

3. The method of claim 1, wherein the aqueous solution is substantially free of a co-solvent.

4. The method of claim 1, wherein the $Fe(CN)_6^{4-}$ is present in the aqueous solution at a concentration ranging in a range of from 1 M to 3 M.

5. The method of claim 1, wherein a molar ratio of sodium ions to potassium ions in the aqueous solution is in a range of from 1:10 to 10:1.

6. The method of claim 5, wherein the molar ratio of sodium ions to potassium ions is in a range of from 0.9:1 to 1.1:1.

7. The method of claim 1, further comprising adding one or more of a buffering agent, a supporting electrolyte, a viscosity modifier, or a wetting agent to the aqueous solution.

* * * * *